(12) United States Patent
Morin et al.

(10) Patent No.: US 9,408,046 B2
(45) Date of Patent: Aug. 2, 2016

(54) 911 DATA MESSAGING

(75) Inventors: Drew Morin, Davidsonville, MD (US); Mark Titus, Annapolis, MD (US); Roger S. Marshall, Auburn, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 559 days.

(21) Appl. No.: 11/812,619

(22) Filed: Jun. 20, 2007

(65) Prior Publication Data
US 2008/0081646 A1 Apr. 3, 2008

Related U.S. Application Data (60) Provisional application No. 60/848,655, filed on Oct. 3, 2006.

(51) Int. Cl.
*H04W 4/02* (2009.01)
*H04W 4/12* (2009.01)
*H04W 4/22* (2009.01)
*H04W 76/00* (2009.01)

(52) U.S. Cl.
CPC . *H04W 4/12* (2013.01); *H04W 4/02* (2013.01); *H04W 4/22* (2013.01); *H04W 76/007* (2013.01)

(58) Field of Classification Search
CPC ........... H04W 4/12; H04W 4/14; H04W 4/20; H04W 4/22; H04W 4/02; H04W 76/007
USPC ................. 455/404.1–404.2, 456.1–457, 466
See application file for complete search history.

(56) References Cited

U.S. PATENT DOCUMENTS

| | | | |
|---|---|---|---|
| 1,103,073 | A | 7/1914 | O'Connel |
| 3,400,222 | A | 9/1968 | Nightingale |
| 4,494,119 | A | 1/1985 | Wimbush |
| 4,651,156 | A | 3/1987 | Martinez |
| 4,706,275 | A | 11/1987 | Kamil |
| 4,891,638 | A | 1/1990 | Davis |

(Continued)

FOREIGN PATENT DOCUMENTS

| WO | WO 02/11407 | 7/2001 |
|---|---|---|
| WO | WO2007/025227 | 3/2007 |

OTHER PUBLICATIONS

47 Code of Federal Regulations (Oct. 1, 2005 Edition).*

(Continued)

*Primary Examiner* — Marcos Torres
(74) *Attorney, Agent, or Firm* — Tarolli, Sundheim, Covell & Tummino LLP (57) ABSTRACT

A short messaging system (SMS) emergency services 911 system (SMS E911). Excess non-voice capacity is used to establish a Short Message Service (SMS) capability for generating an emergency 911 "equivalent" call, together with location information required by emergency services and to meet Federal 911 requirements. 911 requests for emergency assistance are delivered using non-voice centric sources such as SMS, email, and/or autonomous data/message generation devices. SMS 911 capability enables SMS savvy consumers to generate requests for emergency assistance to the local Public Safety Answering Point (PSAP). The SMS 911 emergency services request can be understood by an otherwise conventional PSAP, including provision of location information, and translated to provide first responders with the emergency services information they need to offer timely assistance.

28 Claims, 10 Drawing Sheets

(56) References Cited

U.S. PATENT DOCUMENTS

| | | |
|---|---|---|
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinami |
| 5,081,667 A | 1/1992 | Drori et al. |
| 5,119,104 A | 6/1992 | Heller |
| 5,144,283 A | 9/1992 | Arenas et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell et al. |
| 5,235,630 A | 8/1993 | Moody et al. |
| 5,239,570 A | 8/1993 | Koster et al. .................. 709/203 |
| 5,266,944 A | 11/1993 | Carroll et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergren et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singere et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,590,417 A | 12/1996 | Rydbeck |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,724,667 A | 3/1998 | Furuno |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | Delorme et al. |
| 5,806,000 A | 9/1998 | Vo et al. |
| 5,822,700 A | 10/1998 | Hult et al. |
| 5,825,283 A | 10/1998 | Camhi |
| 5,828,740 A | 10/1998 | Khuc et al. |
| 5,905,736 A | 5/1999 | Ronen et al. |
| 5,920,820 A | 7/1999 | Qureshi |
| 5,920,821 A | 7/1999 | Seazholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,026,292 A | 2/2000 | Coppinger |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,073,004 A | 6/2000 | Balachandran |
| 6,073,015 A | 6/2000 | Berggren |
| 6,075,982 A | 6/2000 | Donovan et al. |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,138,158 A | 10/2000 | Boyle et al. .................. 709/219 |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesley |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,219,669 B1 | 4/2001 | Haff |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh et al. |
| 6,289,373 B1 | 9/2001 | Dezonno |
| 6,314,108 B1 | 11/2001 | Ramasubramani et al. |
| 6,317,594 B1 | 11/2001 | Gossman et al. |
| 6,321,257 B1 | 11/2001 | Kotola et al. ................. 370/465 |
| 6,327,479 B1 | 12/2001 | Mikkola |
| 6,353,621 B1 | 3/2002 | Boland |
| 6,370,242 B1 | 4/2002 | Speers |
| 6,373,930 B1 | 4/2002 | McConnell et al. |
| 6,393,014 B1 | 5/2002 | Daly et al. ..................... 709/225 |
| 6,396,913 B1 | 5/2002 | Perkins et al. |
| 6,397,064 B1 | 5/2002 | Bridges |
| 6,473,622 B1 | 10/2002 | Meuronen |

(56) References Cited

U.S. PATENT DOCUMENTS

| | | |
|---|---|---|
| 6,480,710 B1 | 11/2002 | Laybourn |
| 6,507,589 B1 | 1/2003 | Ramasubramani et al. .. 370/465 |
| 6,512,930 B2 | 1/2003 | Sandegren |
| 6,526,335 B1 | 2/2003 | Treyz |
| 6,529,722 B1 | 3/2003 | Heinrich |
| 6,654,786 B1 | 11/2003 | Fox et al. ............ 340/531 |
| 6,667,688 B1 | 12/2003 | Menard et al. ............ 370/352 |
| 6,675,017 B1 | 1/2004 | Zellner et al. |
| 6,677,894 B2* | 1/2004 | Sheynblat et al. ...... 342/357.46 |
| 6,690,940 B1 | 2/2004 | Brown |
| 6,721,396 B2 | 4/2004 | Chin |
| 6,728,353 B1 | 4/2004 | Espejo |
| 6,731,943 B1 | 5/2004 | McCormick |
| 6,744,858 B1 | 6/2004 | Ryan |
| 6,771,742 B2 | 8/2004 | McCalmont et al. |
| 6,799,049 B1 | 9/2004 | Zellner |
| 6,868,074 B1 | 3/2005 | Hanson |
| 6,898,633 B1 | 5/2005 | Lyndersay |
| 6,915,138 B2 | 7/2005 | Kraft |
| 6,937,597 B1 | 8/2005 | Rosenberg |
| 6,970,869 B1 | 11/2005 | Slaughter et al. |
| 6,970,871 B1 | 11/2005 | Rayburn |
| 6,993,325 B1 | 1/2006 | Waesterlid |
| 7,020,480 B2* | 3/2006 | Coskun et al. ............ 455/466 |
| 7,054,659 B2 | 5/2006 | Gioscia |
| 7,092,385 B2 | 8/2006 | Gallant |
| 7,110,773 B1 | 9/2006 | Wallace |
| 7,120,418 B2 | 10/2006 | Herajarvi |
| 7,123,874 B1 | 10/2006 | Brennan |
| 7,127,264 B2 | 10/2006 | Hronek |
| 7,130,383 B2 | 10/2006 | Naidoo et al. |
| 7,145,462 B2 | 12/2006 | Dewing |
| 7,180,415 B2 | 2/2007 | Bankert |
| 7,184,418 B1 | 2/2007 | Baba |
| 7,245,216 B2 | 7/2007 | Burkley |
| 7,260,186 B2 | 8/2007 | Zhu |
| 7,317,705 B2 | 1/2008 | Hanson |
| D562,808 S | 2/2008 | Gwee et al. |
| 7,328,031 B2 | 2/2008 | Kraft |
| 7,356,328 B1 | 4/2008 | Espejo |
| 7,366,157 B1 | 4/2008 | Valentine |
| 7,386,588 B2 | 6/2008 | Mousseau |
| 7,437,348 B1 | 10/2008 | Wyett |
| 7,440,442 B2 | 10/2008 | Grabelsky |
| 7,522,182 B2* | 4/2009 | Bang ...................... 348/14.08 |
| 7,522,581 B2 | 4/2009 | Acharya |
| 7,603,148 B2 | 10/2009 | Michalak |
| 7,693,546 B1 | 4/2010 | Gioscia |
| 7,702,081 B1 | 4/2010 | Klesper |
| 7,792,989 B2 | 9/2010 | Toebes |
| 7,822,391 B1 | 10/2010 | Delker |
| 7,826,818 B2 | 11/2010 | Gollnick |
| 7,864,927 B2 | 1/2011 | Loizeaux |
| 7,895,263 B1 | 2/2011 | Kirchmeier |
| 8,014,945 B2 | 9/2011 | Cooper |
| 8,200,291 B2 | 6/2012 | Steinmetz |
| 8,265,326 B2 | 9/2012 | Singh |
| 8,284,980 B2 | 10/2012 | Parker |
| 2001/0006889 A1 | 7/2001 | Kraft |
| 2001/0031641 A1 | 10/2001 | Ung et al. |
| 2001/0034224 A1 | 10/2001 | McDowell |
| 2002/0058515 A1 | 5/2002 | Holler |
| 2002/0086659 A1 | 7/2002 | Lauper |
| 2002/0133568 A1 | 9/2002 | Smith et al. |
| 2002/0155844 A1 | 10/2002 | Rankin |
| 2002/0174073 A1 | 11/2002 | Nordman |
| 2002/0181681 A1 | 12/2002 | Mani |
| 2003/0003909 A1 | 1/2003 | Keronen |
| 2003/0058096 A1 | 3/2003 | Shteyn |
| 2003/0060214 A1 | 3/2003 | Hendrey |
| 2003/0063730 A1 | 4/2003 | Woodring |
| 2003/0086539 A1 | 5/2003 | McCalmont |
| 2003/0125045 A1 | 7/2003 | Riley |
| 2003/0157942 A1 | 8/2003 | Osmo |
| 2003/0163483 A1 | 8/2003 | Zingher |
| 2003/0169881 A1 | 9/2003 | Niedermeyer |
| 2003/0186709 A1* | 10/2003 | Rhodes et al. ............ 455/456.1 |
| 2003/0186710 A1 | 10/2003 | Muhonen |
| 2003/0187803 A1 | 10/2003 | Pitt |
| 2003/0220835 A1 | 11/2003 | Barnes, Jr. |
| 2004/0043773 A1* | 3/2004 | Lee et al. ............ 455/456.1 |
| 2004/0077359 A1 | 4/2004 | Bernas |
| 2004/0137921 A1 | 7/2004 | Valloppillil |
| 2004/0176123 A1* | 9/2004 | Chin et al. ............ 455/521 |
| 2004/0198386 A1 | 10/2004 | Dupray |
| 2004/0198389 A1 | 10/2004 | Alcock |
| 2004/0203732 A1 | 10/2004 | Brusilovsky |
| 2004/0203863 A1 | 10/2004 | Huomo |
| 2004/0203900 A1 | 10/2004 | Cedervall et al. |
| 2004/0209594 A1 | 10/2004 | Naboulsi |
| 2004/0215687 A1 | 10/2004 | Klemba |
| 2004/0225740 A1 | 11/2004 | Klemba |
| 2005/0003803 A1 | 1/2005 | Buckley |
| 2005/0020242 A1 | 1/2005 | Holland |
| 2005/0021769 A1 | 1/2005 | Kim |
| 2005/0031095 A1 | 2/2005 | Pietrowicz |
| 2005/0053209 A1 | 3/2005 | D'Evelyn |
| 2005/0079877 A1 | 4/2005 | Ichimura |
| 2005/0101338 A1 | 5/2005 | Kraft |
| 2005/0111630 A1 | 5/2005 | Potorny |
| 2005/0119012 A1 | 6/2005 | Merheb |
| 2005/0135569 A1 | 6/2005 | Dickinson |
| 2005/0149430 A1 | 7/2005 | Williams |
| 2005/0176445 A1 | 8/2005 | Qu |
| 2005/0190892 A1 | 9/2005 | Dawson |
| 2005/0197775 A1 | 9/2005 | Smith |
| 2005/0201358 A1 | 9/2005 | Nelson |
| 2005/0201528 A1 | 9/2005 | Meer |
| 2005/0201529 A1 | 9/2005 | Nelson |
| 2005/0213716 A1 | 9/2005 | Zhu |
| 2005/0261012 A1 | 11/2005 | Weiser |
| 2005/0265536 A1 | 12/2005 | Smith |
| 2005/0277432 A1 | 12/2005 | Viana et al. |
| 2005/0282518 A1 | 12/2005 | D'Evelyn |
| 2005/0287979 A1 | 12/2005 | Rollender |
| 2006/0003775 A1 | 1/2006 | Bull et al. |
| 2006/0020965 A1 | 1/2006 | Steelberg |
| 2006/0028995 A1 | 2/2006 | Canoy |
| 2006/0058102 A1 | 3/2006 | Nguyen |
| 2006/0058951 A1 | 3/2006 | Cooper |
| 2006/0109960 A1 | 5/2006 | D'Evelyn |
| 2006/0116138 A1 | 6/2006 | Simsek et al. |
| 2006/0142027 A1 | 6/2006 | Krishnamurthi et al. |
| 2006/0183460 A1 | 8/2006 | Srinivasan et al. |
| 2006/0223549 A1 | 10/2006 | Chang |
| 2006/0233317 A1 | 10/2006 | Coster |
| 2006/0239205 A1 | 10/2006 | Warren |
| 2006/0276168 A1 | 12/2006 | Fuller |
| 2006/0281470 A1 | 12/2006 | Shi |
| 2006/0293024 A1* | 12/2006 | Benco et al. ............ 455/404.2 |
| 2006/0293066 A1 | 12/2006 | Edge |
| 2007/0004424 A1 | 1/2007 | Sheen |
| 2007/0010248 A1 | 1/2007 | Dravida |
| 2007/0021098 A1* | 1/2007 | Rhodes et al. ............ 455/404.1 |
| 2007/0026871 A1 | 2/2007 | Wager |
| 2007/0060097 A1 | 3/2007 | Edge |
| 2007/0110076 A1 | 5/2007 | Brouwer |
| 2007/0117574 A1* | 5/2007 | Watanabe ............ 455/456.1 |
| 2007/0117577 A1* | 5/2007 | Harris ............ 455/466 |
| 2007/0136132 A1 | 6/2007 | Weiser |
| 2007/0149208 A1 | 6/2007 | Syrbe |
| 2007/0149213 A1 | 6/2007 | Lamba |
| 2007/0201623 A1 | 8/2007 | Hines |
| 2007/0253429 A1 | 11/2007 | James |
| 2008/0014964 A1 | 1/2008 | Sudit |
| 2008/0045250 A1 | 2/2008 | Hwang |
| 2008/0137624 A1 | 6/2008 | Silverstrim |
| 2008/0192731 A1 | 8/2008 | Dickinson |
| 2008/0268769 A1 | 10/2008 | Brown |
| 2009/0003535 A1 | 1/2009 | Grabelsky |
| 2009/0029675 A1 | 1/2009 | Steinmetz |
| 2009/0128404 A1 | 5/2009 | Martino |
| 2009/0221263 A1* | 9/2009 | Titus et al. ............ 455/404.2 |
| 2009/0237210 A1 | 9/2009 | Ciesla |

(56) References Cited

U.S. PATENT DOCUMENTS

| | | | |
|---|---|---|---|
| 2009/0323636 | A1 | 12/2009 | Dillon |
| 2010/0076767 | A1* | 3/2010 | Vieri et al. .................. 704/260 |
| 2010/0120412 | A1 | 5/2010 | Tang |
| 2010/0167691 | A1 | 7/2010 | Howarter |
| 2010/0198933 | A1 | 8/2010 | Smith |
| 2010/0233991 | A1 | 9/2010 | Crawford |
| 2010/0262668 | A1 | 10/2010 | Piett |
| 2011/0109468 | A1 | 5/2011 | Hirschfeld |
| 2011/0207429 | A1 | 8/2011 | Maier |

OTHER PUBLICATIONS

PCT Search Report issued in PCT/US008/13690 and mailed on Jan. 29, 2009.
PCT International Search Report (PCTUS2007/16138) and Written Opinion of International Searching Authority, Feb. 7, 2008.
International Search Report in PCT/US2007/20207 dated Apr. 1, 2008.
PCT International Search Report received in PCT/US2007/21133 dated Apr. 21, 2008.
Intrado Inc., Qwest Detailed SR/ALI to MPC/GMLC Interface Specification to TCP/IP Implementation of TIA/EIA/J-STD-036 E2 with Phase I Location Description Addition, Intrado Informed Response; Apr. 2004; Issue 1.11; pp. 1-57.
PCT International Search Report received in PCT/US2007/21133 dated Oct. 31, 2008..
Newsletter "Sonera Bill Warning" Digital Cellular Report. Stevenage: Jun. 17, 1998. vol. 4, Iss.; p. 1.
"Technology Rides Control Network to Support Short Package Applications"; Advanced Intelligent Network New. Washington, DC: Mar. 19, 1997. vol. 7, Iss. 6; p. 1.
Cellular Mobile Pricing Structures and Trends; Dr. Sam Paltridge of the OECD's Directorate for Science, Technology and Industry; Dist.: May 19, 2000 (Nov. 1999).
Schulzrinne et al., Emergency Services for Internet Telephony Systems draft-schulzrinne-sipping-emergency-arch, IETF Standard Working Draft, Feb. 4, 2004, 1-22.
Kim, J.Y., et al., "An Enhanced VoIP Emergency Services Prototype," Proceedings of the 3$^{rd}$ International ISCRAM Conference, Newark, NJ, May 2006.
International Search Report received in PCT/US11/01971 dated Feb. 28, 2013.
International Search Report received in PCT/US2012/067857 dated Feb. 20, 2013.
International Search Report received in PCT/US2012/67689 dated Feb. 22, 2013.
International Search Report received in PCT/US2012/066313 dated Feb. 4, 2013.
The Power of Mobile Unified Messaging: Siemans and Comverse to Demonstrate WAP-Based Messaging Applications on Live GPRS System, Comverse, Feb. 2000.
ETSI/3Gpp, 3$^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.
ETSI,3GPP, 3$^{rd}$ Generation Partnership Project; Technical Specification Group Core Network; Customized Applications for Mobile network Enhanced Logic; (CAMEL) Phase 3—Stage 2 (3G TS 23.078 version 3.3.0), Dec. 199, pp. 300-329.
Bond, "Cellular Carriers Use Prepaid Programs to Reach Untapped Markets," Billing World, Mar. 1997, pp. 14-17.
Freedom Wireless, "The Freedom to Chose! Get Pre-Pay Cellular," sales pamphlet, undated.
MultiMedia Publishing Corp., "Prepaid Cellular and Prepaid Wireless Market Report and Forecast 1997-2002," sales literature, undated.
NEXTLINK, "Introducing a New Prepaid Telephone Service from NEXTLINK," sales literature, undated.
Open Development Corp., "openMedia Cellular Prepaid," sales literature, undated.
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
Tecore, Inc., "Pre-Paid Cellular," sales literature, Mar. 25, 1997, pp. 1-4.

* cited by examiner

911 DATA MESSAGING

This application claims priority from U.S. Provisional Application No. 60/848,655, filed Oct. 3, 2006, entitled "911 Data Messaging", to Morin et al., the entirety of which is expressly incorporated herein by reference.

BACKGROUND OF THE INVENTION

1. Field of the Invention

This invention relates generally to telecommunications. More particularly, it relates to location based services (LBS) and wireless emergency services such as E911, and short messaging system (SMS) messaging.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without the caller's actual callback number or location information displayed at the emergency operator's terminal.

The current 911 infrastructure is designed to route a live voice call to a local public safety answering point (PSAP). This requires that voice circuits be available. The result of an E911 call is a direct circuit switched voice connection between an emergency service requester and a suitable responder. 911 is further enhanced with the ability to deliver location over a data channel in parallel to the call. The location data is typically staged in a database that is queried by the PSAP to determine location information.

Figure 7:
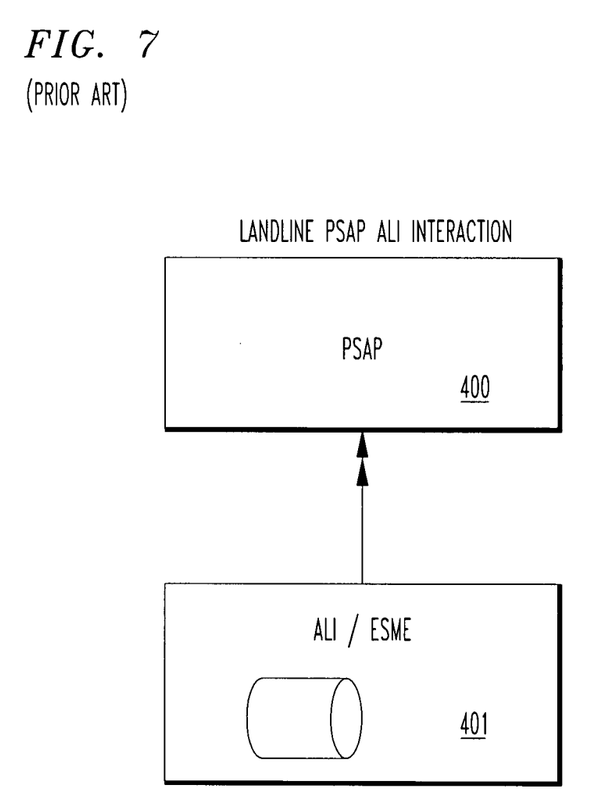
FIG. 7 shows a conventional landline public safety access point (PSAP) to automatic location identifier (ALI) connection.

FIG. 7 shows a conventional landline public safety access point (PSAP) to automatic location identifier (ALI) connection.

In particular, FIG. 7 shows a PSAP 400 connected to one Automatic Location Identifier (ALI) database 401. Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

An ALI is typically owned by a local exchange carrier (LEC) or a PSAP, and may be regional (i.e. connected to many PSAPs) or standalone (i.e. connected to only one PSAP). There is currently no one single standard interface protocol for PSAP-ALI connection/communication.

Figure 8:
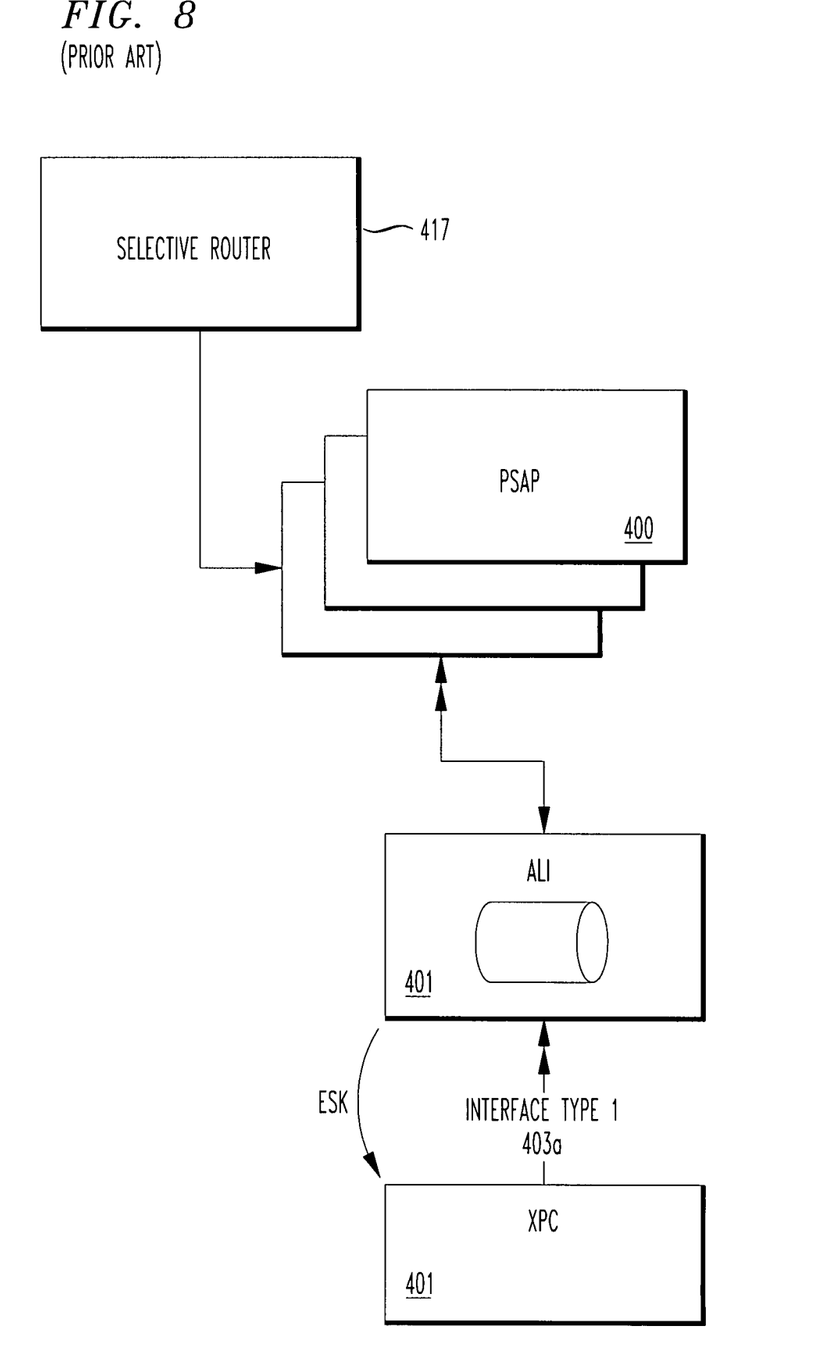
FIG. 8 shows a context diagram for a conventional non-landline positioning center (e.g., an Internet based voice over Internet Protocol (VoIP) positioning center).

FIG. 8 shows a context diagram for a conventional non-landline positioning center (e.g., an Internet based voice over Internet Protocol (VoIP) positioning center).

In particular, the ALI database 401 includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400 query the ALI 401 for location information. However, the ALI 401 is not pre-provisioned with location data for non-landline calls (e.g. cellular, VoIP etc) and must communicate with other network entities to obtain and deliver location data to the PSAP 400.

Non-landline telephony standards (e.g. cellular, VoIP etc) have mandated that ALIs 401 maintain connectivity to a positioning center 402 that is able to provide current location data for a non-landline call. In the current state of technology, the positioning center 402 provides the caller's location and the callback number to the ALI, which passes it to the requesting PSAP. As can be seen in FIG. 8, an ALI may maintain connectivity to more than one positioning center via multiple interface types—both standard and non-standard (e.g. NENA-02, E2/E2+N-E2(ESP), PAM, etc.).

As used herein, the generic term "XPC" refers interchangeably to any standards-based positioning center. As examples, a positioning center 402 may be any one of the following types used in non-landline networks:

GMLC (Gateway Mobile Location Center): The positioning center that retrieves, forwards, stores and controls emergency position data within the GSM location network.

MPC (Mobile Position Center): The positioning center that retrieves, forwards, stores and controls emergency position data within the ANSI location network.

VPC (VoIP Positioning Center): The positioning center which retrieves, forwards, stores and controls emergency position data within the VoIP location network.

The term "XPC network" is used herein when appropriate to refer to any non-landline network where a positioning center 402 responds to ALI queries including an emergency services key for location, e.g., cellular, VoIP etc.

911 calls require voice circuits to be available to complete the voice call to a PSAP. For the most part, PSAPs are capable of receiving only voice calls. Connectivity with a PSAP, established either through the existing time division multiplexed (TDM)-based emergency services network (ESN), or directly over the public switched telephone network (PSTN) to the PSAP, is managed through dedicated telephone switches that cannot be directly dialed.

The present inventors have appreciated that during times of regional crises, such as during a hurricane, the local wireless infrastructure can become overloaded by call volume. This was experienced during the Sep. 11, 2001, terrorist attacks during which voice telecommunications along the east coast was subjected to service failures.

There is a long-felt need for improving emergency communications to provide a system that is more rugged and reliable during times of regional crisis.

SUMMARY OF THE INVENTION

In accordance with the principles of the present invention, a method of providing text message E911 emergency services comprises receiving a text message E911 emergency data request from an end user requiring emergency assistance. A geographic location of a sender of the text message E911 emergency data request is associated with the text message E911 emergency data request. The geographic location of the sender of the text message E911 emergency data request is staged in a database for access by emergency services.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present invention provides a short messaging system (SMS) emergency services 911 system (SMS E911).

The inventors herein have appreciated that voice telecommunications networks tend to overload during wide scale emergencies. The inventors have also appreciated that during exemplary times of circuit overload, the Signaling System Number 7 (SS7) signaling network has had excess capacity available to carry short message traffic. They also appreciated that SMS packet-based (i.e., not switched or persistent connection) technology bandwidth remained available to generate traffic from a handset and deliver a message to another handset or to an Internet Address.

An alternative technology is provided for emergency contact with a public safety answering point (PSAP), useful particularly for getting emergency information routed when voice networks become overloaded. The alternative technology disclosed herein creates the ability of non-voice communications to include emergency 911 support. The invention enables use of this excess non-voice capacity by establishing a Short Message Service (SMS) capability for generating an emergency 911 "equivalent" call, together with location information required by emergency services and to meet Federal 911 requirements.

This invention offers a solution architecture and method for delivery of 911 requests for emergency assistance using non-voice centric sources such as SMS, email, and/or autonomous data/message generation devices.

SMS 911 capability in accordance with the principles of the present invention enables SMS savvy consumers to generate requests for emergency assistance to the local Public Safety Answering Point (PSAP). The SMS 911 emergency services request can be understood by an otherwise conventional PSAP, including provision of location information, and translated to provide first responders with the emergency services information they need to offer timely assistance.

In the early 1990s, as a result of the growing popularity of digital wireless technology, a standard for digital wireless networks was introduced in Europe. That standard, now known as the global standard for mobiles (GSM), included a service called short messaging service (SMS). An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods.

Each SMS network typically includes a short message service center (SMSC) which acts as a store-and-forward mechanism providing guaranteed delivery of short messages to a subscriber.

Short message services are advantageous over text based paging services because of the capability of bi-directional communication. Such bi-directional communication allows, for example, notification to the originating device of the success or failure of the short message delivery.

A variety of services have been introduced using SMS networks including, for example, integrated electronic mail and fax, integrated paging, interactive banking, and information services such as stock quotes and airline schedule delivery. A mobile originated-to-HTTP gateway (co-owned by the owner of the present patent application) has been patented in U.S. Pat. No. 6,891,811, the entirety of which is expressly incorporated herein by reference.

Figure 9:
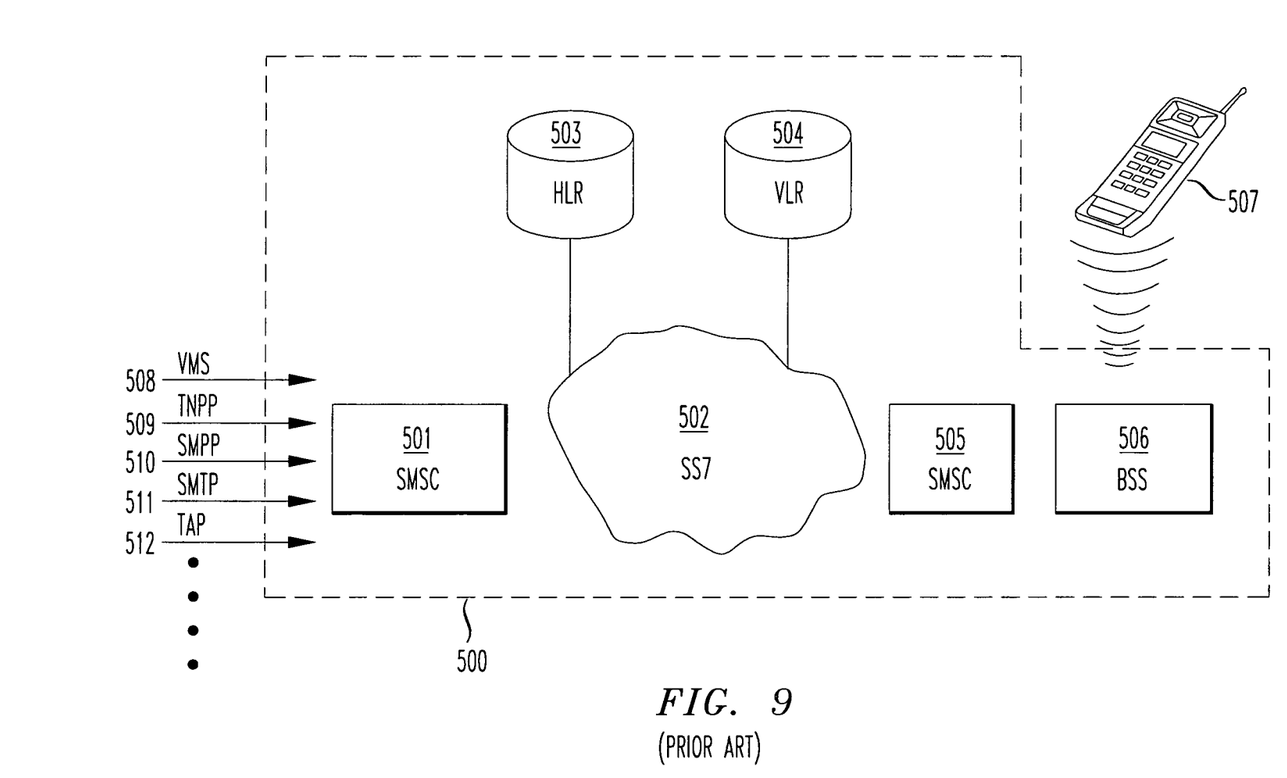
FIG. 9 shows an exemplary structure of an SMS network.

FIG. 9 shows an exemplary structure of an SMS network 500. Although the following example is described using terms and protocols mainly as defined by the North American standard IS-41, it will be apparent to one skilled in the art that the example is applicable to any networks that offer a store-and-forward type short message service.

A smaller SMS network 500 typically includes one short message service center (SMSC) 501. The SMSC 501 typically includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via TCP/IP, e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502.

The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs.

The base station subsystem (BSS) 506 handles the wireless communications, e.g., RF transmission and reception of voice and data traffic, to and from the mobile subscriber 507.

Figure 10:
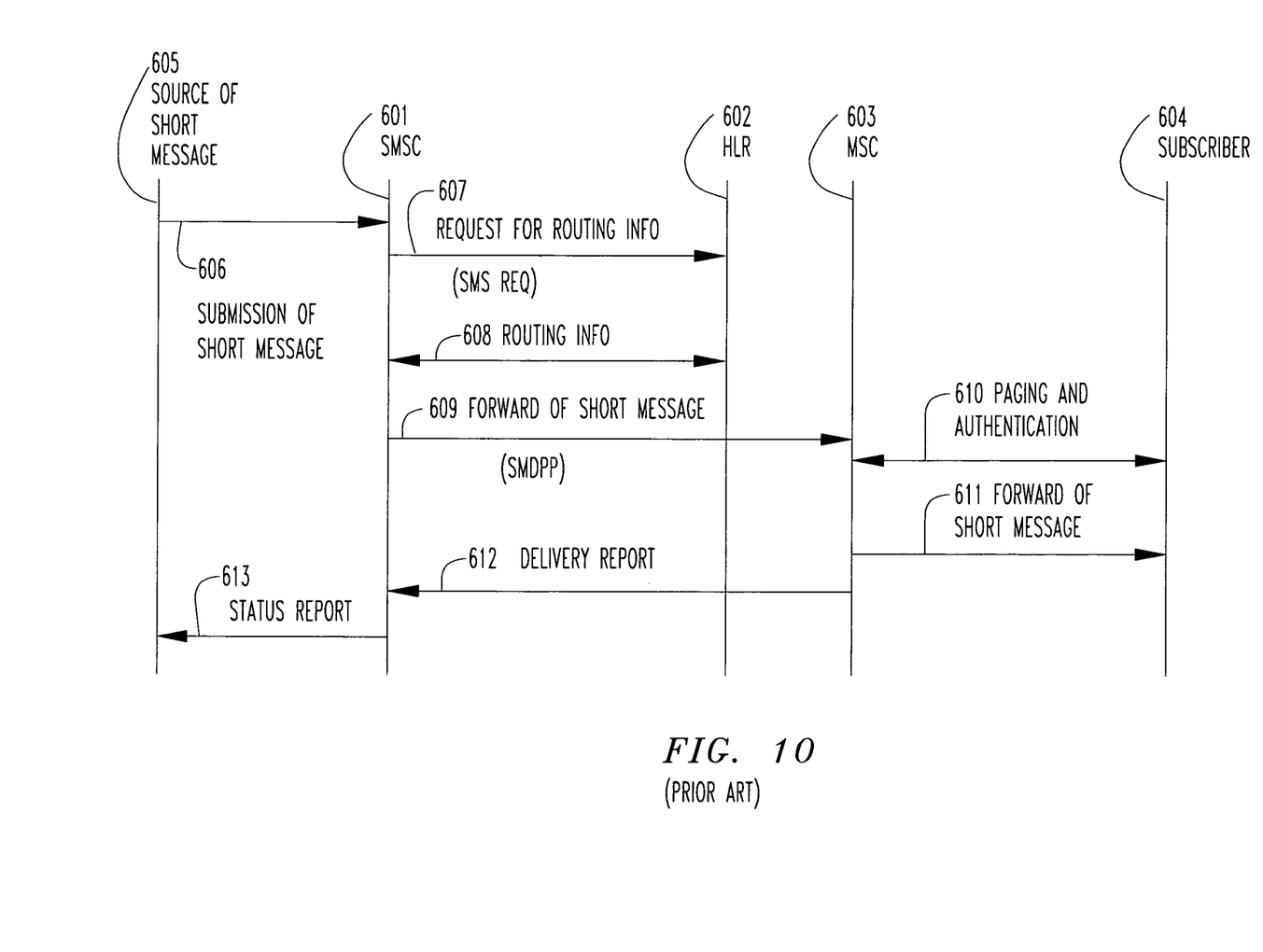
FIG. 10 shows an exemplary flow of a short message through a conventional SMS network.

FIG. 10 shows an exemplary flow of a short message through a conventional SMS network. Although FIG. 10 shows only an example of short message delivery to a mobile subscriber, it is to be understood that a mobile subscriber or any other source may originate a short message. The flow of a mobile subscriber originated short message would involve similar processes as in the following mobile subscriber terminated short message example, and would be apparent to one of ordinary skill in the art.

The SMSC 601 receives a short message intended for a subscriber 604 from a source of short message 605 which may be any one or more of the aforementioned sources of short messages, e.g., 508-512 of FIG. 9. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process, and sends the subscriber information to the MSC 603. The MSC 603, using the information received from the VLR, delivers the short message to the intended subscriber 604, and sends a delivery report 612 to the SMSC 601. The SMSC 601 may send the result of the delivery, i.e., the status report 613, to the source of the short message 605 if requested.

The present invention enables the use of short messaging services to communicate with emergency services such as a PSAP, particularly useful during times of a large regional emergency.

Figure 1:
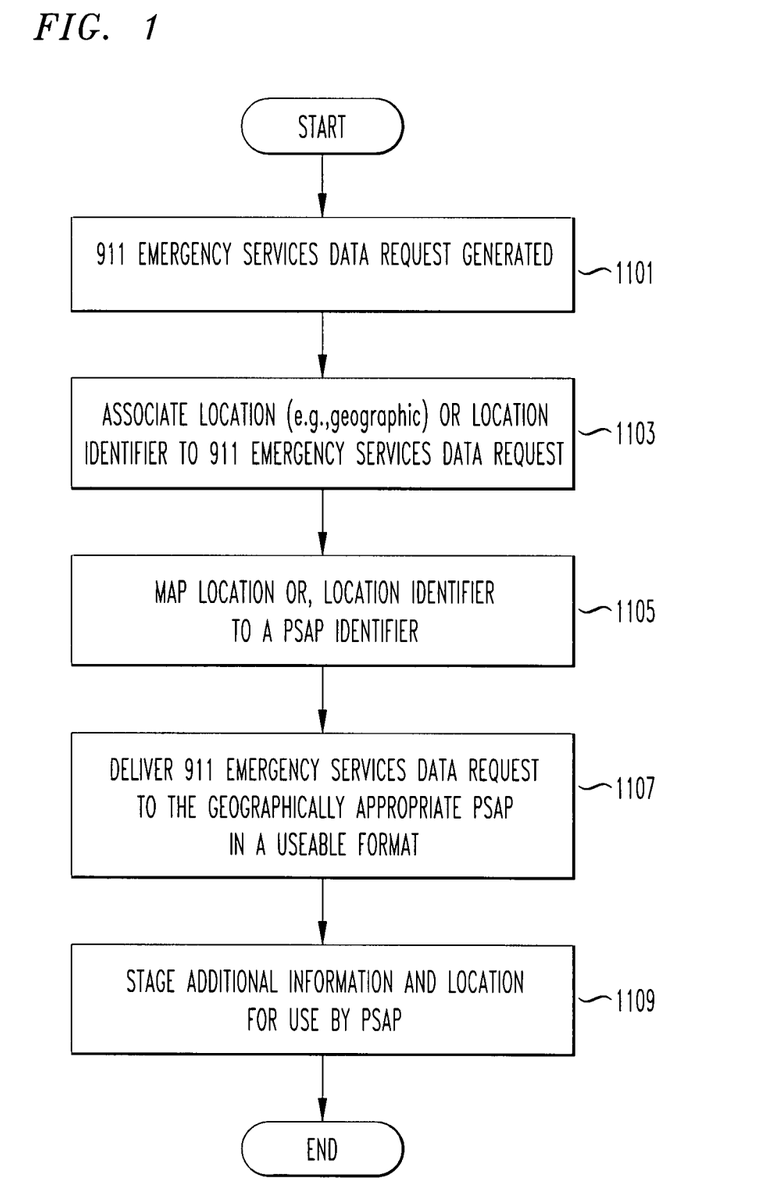
FIG. 1 shows an exemplary process of providing 911 data messaging services, in accordance with the principles of the present invention.

FIG. 1 shows an exemplary process of providing 911 data messaging services, in accordance with the principles of the present invention.

In particular, as shown in step 1101 of FIG. 1, a 911 emergency services data request is generated from a source device. The 911 emergency services data request is preferably a text message. Exemplary text messages include a short messaging system (SMS) text message, an email, or other non-live-voice packet based data message technology. The inventive technology is also applicable to use of multi-media system (MMS) message to make a 911 emergency services data request.

In step 1103, the 911 emergency services data request is associated with a geographic location (i.e., "geo-location"), civic location (e.g., street address, placename), or a location identifier (e.g., a MSC/Cell-Site indicator, URI, or URL which point to a location). The association of location with the device initiating the 911 emergency services data request is performed in a same way as is known for providing location to a cellular phone or other wireless device.

In step 1105, the location associated with a 911 emergency services data request for emergency services is mapped to a PSAP identifier (e.g., emergency services number (ESN)), using a table lookup, or geo-coding procedure such as would transform a geo-location to a physical address. Exemplary physical addresses include a postal address or a validated address from a master street address guide (MSAG).

In step 1107, the 911 emergency services data request is delivered in a useable format to a public services access point (PSAP), or other emergency services monitoring location. An exemplary useable format includes, e.g., plain text. Another non-voice data request includes a pre-recorded voice message digitized and packetized. A pre-recorded voice message may be delivered to a call center that translates data to voice, i.e., text to speech.

In step 1109, the location of the emergency caller, and/or other suitable information relating to the emergency services 911 call, may be staged for use by the PSAP (or other monitoring service location), e.g., in a location center.

Figure 2:
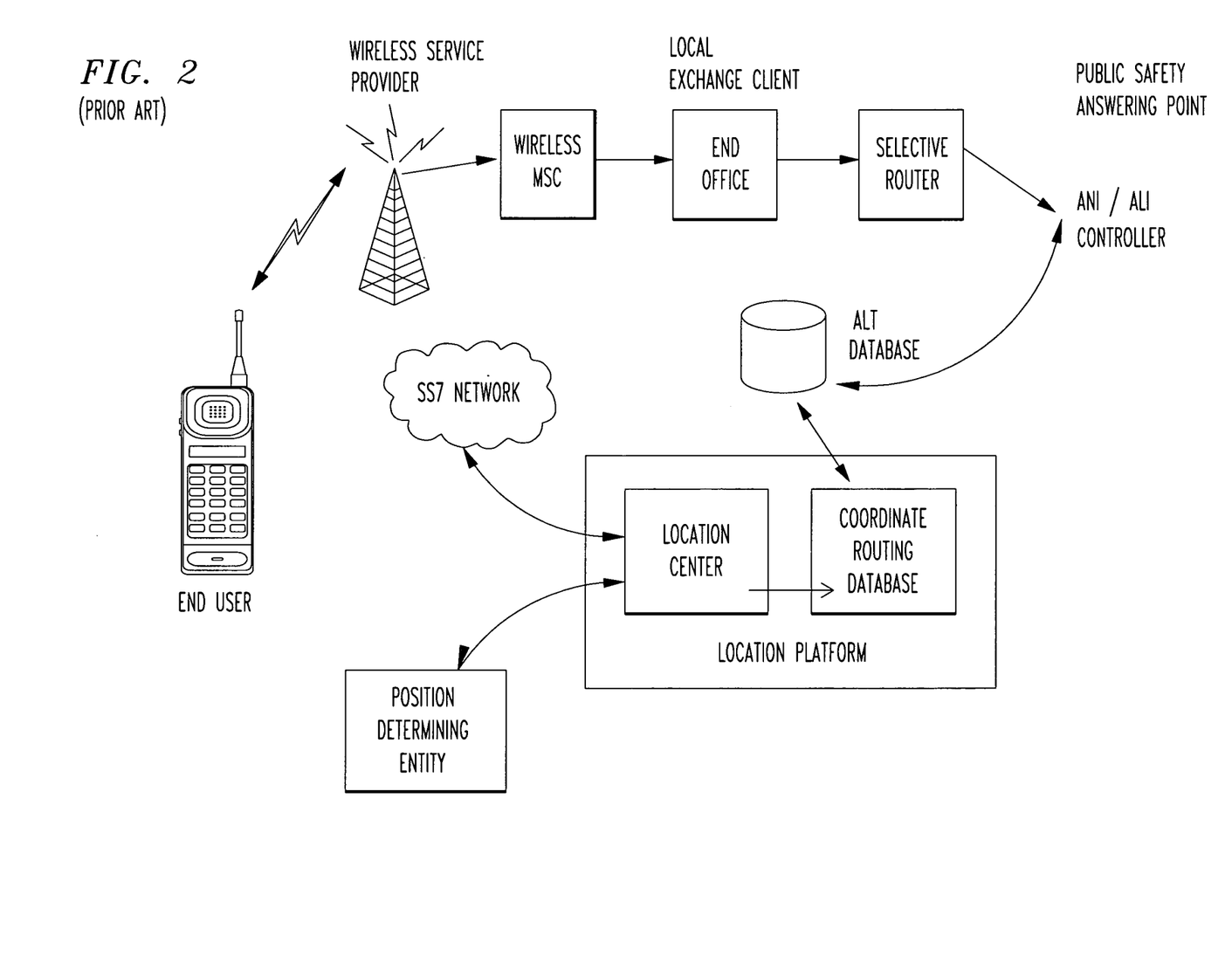
FIG. 2 shows a quick overview of conventional enhanced 9-1-1 (E911) call flow with respect to a conventional voice 911 emergency call.

FIG. 2 shows a quick overview of conventional enhanced 9-1-1 (E911) call flow with respect to a conventional voice 911 emergency call.

In particular, as shown in step 1 of FIG. 2, an end user dials 911 on their voice phone. The emergency voice 911 call is delivered from the relevant handset, through a radio tower and base station, to a mobile switching center (MSC).

In step 2, the MSC queries a location platform (e.g., the XYPOINT™ location platform commercially available from TeleCommunication Systems, Inc. in Annapolis, Md.) for location retrieval and call routing. Typically, the location platform immediately returns call setup information to the MSC (step 5), based on gross location (e.g., Serving Cell ID), or alternatively, the emergency voice 911 call may be held, (based on configuration), until more precise location information is delivered to a location center (step 3).

In step 3, the location platform sends a request for precise position information to the position determining entity (e.g., PDE), and retrieves location coordinates (may include "fast" and subsequent "normal" (higher granularity) position coordinates) from the position determining entity (e.g., PDE).

In step 4, the location platform finds matching address, and stages location and callback information.

In step 5, after the location center triggers a request for precise location, the location center responds to the mobile switching center (MSC) with call routing information.

Note that call setup, i.e., "PSAP routing", today is almost exclusively done based on gross (Serving Cell ID) location information. No carrier wants to hold up an emergency call. However, call routing based on precise location is certainly configurable, and may be a better fit for SMS-based 911 requests as it plays out. While the disclosed embodiments relate to the typical scenario used today for making emergency calls, the invention relates equally to future scenarios for making emergency calls.

In step 6, the MSC then releases the emergency voice 911 call, and routes it to the correct public safety answering point (PSAP) through a selective router based on information provided from the location center.

The location center then stages a record for subsequent delivery to an automatic location information (ALI) database.

In step 7, the PSAP queries the ALI database, which queries the location platform for location and callback information.

When the precise location of the data emergency services source, or 'caller', is returned to the location center from a position determining entity (PDE), this location coordinate information may be transcoded into a civic (street address) location, and is staged, along with call back information for retrieval by the ALI database.

Figure 3:
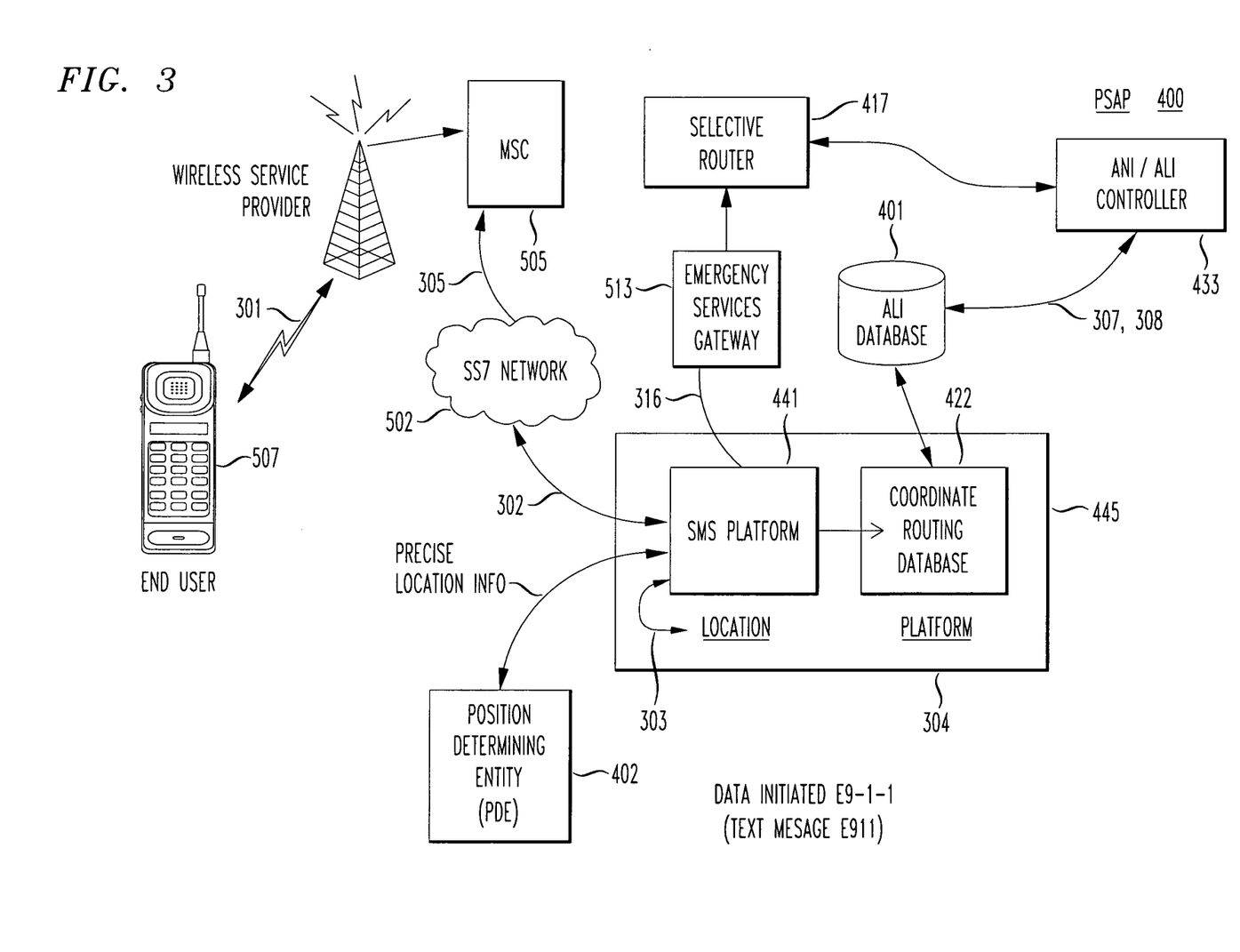
FIG. 3 shows message flow for a 911 emergency services text message, providing data (non-voice) initiated E9-1-1 emergency services data requests, in accordance with the principles of the present invention.

FIG. 3 shows message flow for a 911 emergency services text message, providing data (non-voice) initiated E9-1-1 emergency services data requests, in accordance with the principles of the present invention.

In particular, as shown in FIG. 3, an end user wireless device 507 enters an SMS text message E911 emergency data request, and sends the same, destined for the appropriate PSAP 400 via a mobile switching center (MSC) 505, a Signaling System No. 7 (SS7) network 502, e.g., the public switched telephone network (PSTN), and a selective router 417.

Note that SMS-originated messages are delivered primarily as text, instant message (IM), or optionally as voice. The case of delivering voice, as in a pre-recorded message, may be done, e.g., either as an attachment, a multi-media protocol/application, or via the existing legacy TDM/SR network (as shown) if something like a reverse IVR is used. While the present embodiment refers to a delivery mechanism to the PSAP as being across the legacy emergency services network through a selective router, delivery to the PSAP may be via any of a multitude of methods, e.g., text, email, voice-recording, etc.

Importantly, location information relating to the SMS text message E911 emergency data request is queried through an ANI/ALI controller 433 at the PSAP, an automatic location identification (ALI) database 401, obtained by a position determining entity 402, and staged by an appropriate location platform 304.

In step 301 of FIG. 3, an SMS data E9-1-1 emergency data request is generated by an end user device 507, with location for delivery to an appropriate PSAP 400. In this embodiment, the source of the emergency SMS text message E911 emergency data request is a handset device 507 that sends a text (i.e., non-voice) message to an appropriate data services address, URI, URN, or URL, (e.g., SMS to address of "911" or Service Identifier of urn:service:sos, etc.) Texting to 911 is distinctive from dialing a 911 phone number via the SS7 network 502.

The SMS text message E911 emergency data request traverses the radio network and the base station controller, and then is delivered to the MSC 505.

In step 302, the MSC 505 routes the SMS text message E911 emergency data request to a carrier's appropriate location based services (LBS) proxy, or short messaging service (SMS) platform 441. An exemplary SMS platform 441 embodying the present invention is known as an smsExpress™ platform now commercially available from Tele-Communication Systems, Inc. of Annapolis, Md.

The SMS platform 411 recognizes the message type of the incoming SMS text message E911 emergency data request as an E911 text message, and activates the appropriate process as shown and described generally with respect to FIG. 1.

The SMS platform 411 processes the incoming SMS text message E911 emergency data request to determine the originator of that SMS text message, and to extract the content or payload of the emergency text message. The SMS platform 411 (e.g., the smsExpress™ platform) logs this information for future reference for use to establish a two-way communication channel if necessary.

In step 303, "precise" location data relating to the sender of the SMS text message E911 emergency data request is retrieved. Note that in some cases, the "gross" location data is not available, but can be dealt with, e.g., using a return query, home location register (HLR) query, or other source address comparison query, as is otherwise known with respect to locating a wireless caller. The location platform 445 retrieves location coordinates from either SMDPP message or operator location based services.

In step 304, the "gross" location is translated to a civic location e.g., street address. The location platform determines "gross" and "precise" location for the SMS-originated message, and optionally translates it to a civic location (e.g., street address), and stages the location and callback information for use by a querying PSAP 400.

The associated location of the SMS text message E911 emergency data request is used to determine the serving PSAP identifier.

A standard, pre-recorded or synthesized voice message may be generated for the PSAP operator to alert them to the SMS text message E911 emergency data request. For example, the audible message generated by the SMS text message E911 emergency data request may state "This is an emergency 9-1-1 text message".

As depicted in step 305, the SMS platform 411 may send a received message response to the end user 507 that initially sent the SMS text message E911 emergency data request.

In step 306, the SMS platform 441 establishes a proxy 9-1-1 call to the Emergency Services Gateway (ESG) 513 that then routes it to the appropriate PSAP, optionally, via a selective router 417. Note that other routing approaches are possible to get the canned audio message to the PSAP 400.

In step 307, the PSAP 307 queries the ALI database 401, which queries the SMS platform 411 for location and callback information. In step 308 the location information (and optionally at least the payload of the SMS text message E911 emergency data request itself arrives at the appropriate PSAP 400.

Note that the SMS text message E911 emergency data request itself may be staged as a record in the ALI database 401. Alternatively, a unique pointer or key to the actual SMS text message E911 emergency data request (or other real-time packetized data message requesting emergency services) could be staged in the ALI database 401.

In the disclosed embodiments, the SMS platform 441 generates a request to a location based services (LBS) proxy to query precise location from a position determining entity 402.

The LBS proxy receives precise location information, and geo-codes this information using a coordinate routing database 442. The geo-coded information is staged (optionally along with the payload of the SMS text message E911 emergency data request) in the ALI database 401.

Figure 4:
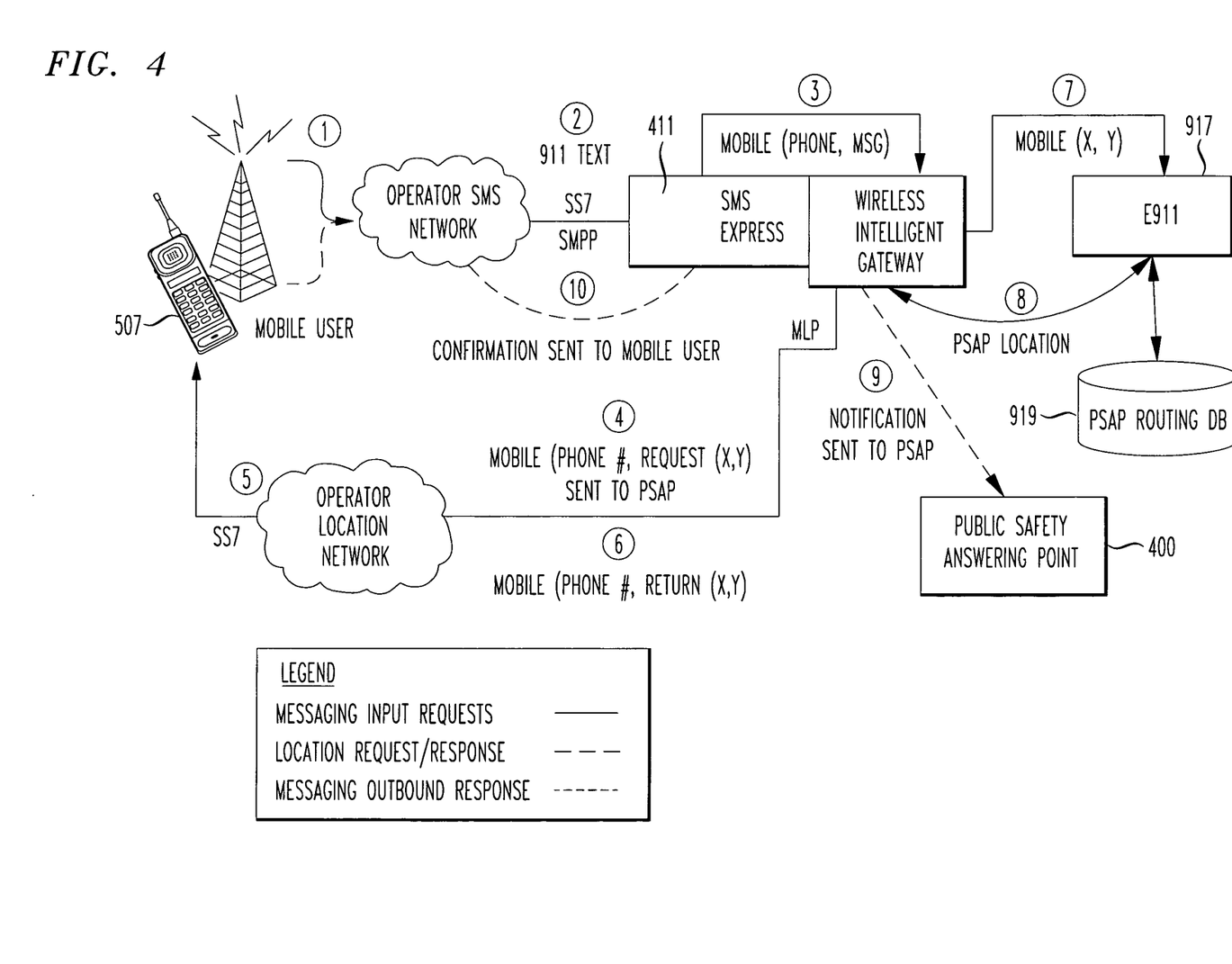
FIG. 4 depicts a high level view of the service interaction between messaging and location based systems, in accordance with the principles of the present invention.

FIG. 4 depicts a high level view of the service interaction between messaging and location based systems, in accordance with the principles of the present invention.

In particular, as shown in step 1 of FIG. 4, the mobile user 507 initiates an SMS text message E911 emergency data request, and sends the same through their carrier's SMS network.

In step 2, the SMS text message E911 emergency data request is passed by the SMS network, using SS7 (or SMPP) protocols, to an SMS platform 411.

In step 3, the SMS platform 411 passes a source ID such as the phone number of the mobile user 507, and the payload of the SMS text message E911 emergency data request itself, to a wireless Intelligent Gateway.

In step 4, the wireless Intelligent gateway requests location with the phone number of the source as input, and gets location coordinates in return.

In step 5, the location entity attempts to obtain actual location of the mobile user 507 directly from the mobile user 507 (or uses any of a number of known alternative methods for finding actual location).

In step 6, the location of the mobile user 507 is returned to the wireless Intelligent gateway.

In step 7, the wireless Intelligent gateway provides the location of the mobile user 507 to an E911 gateway 917. The E911 gateway searches a PSAP routing database 919 for the appropriate PSAP serving the current location of the mobile user 507, and in step 8 provides the identity of the appropriate PSAP 400 back to the wireless Intelligent gateway.

In step 9, notification of the SMS text message E911 emergency data request, along with delivery of location relating to the sender, is provided to the appropriate PSAP 400.

Figure 5:
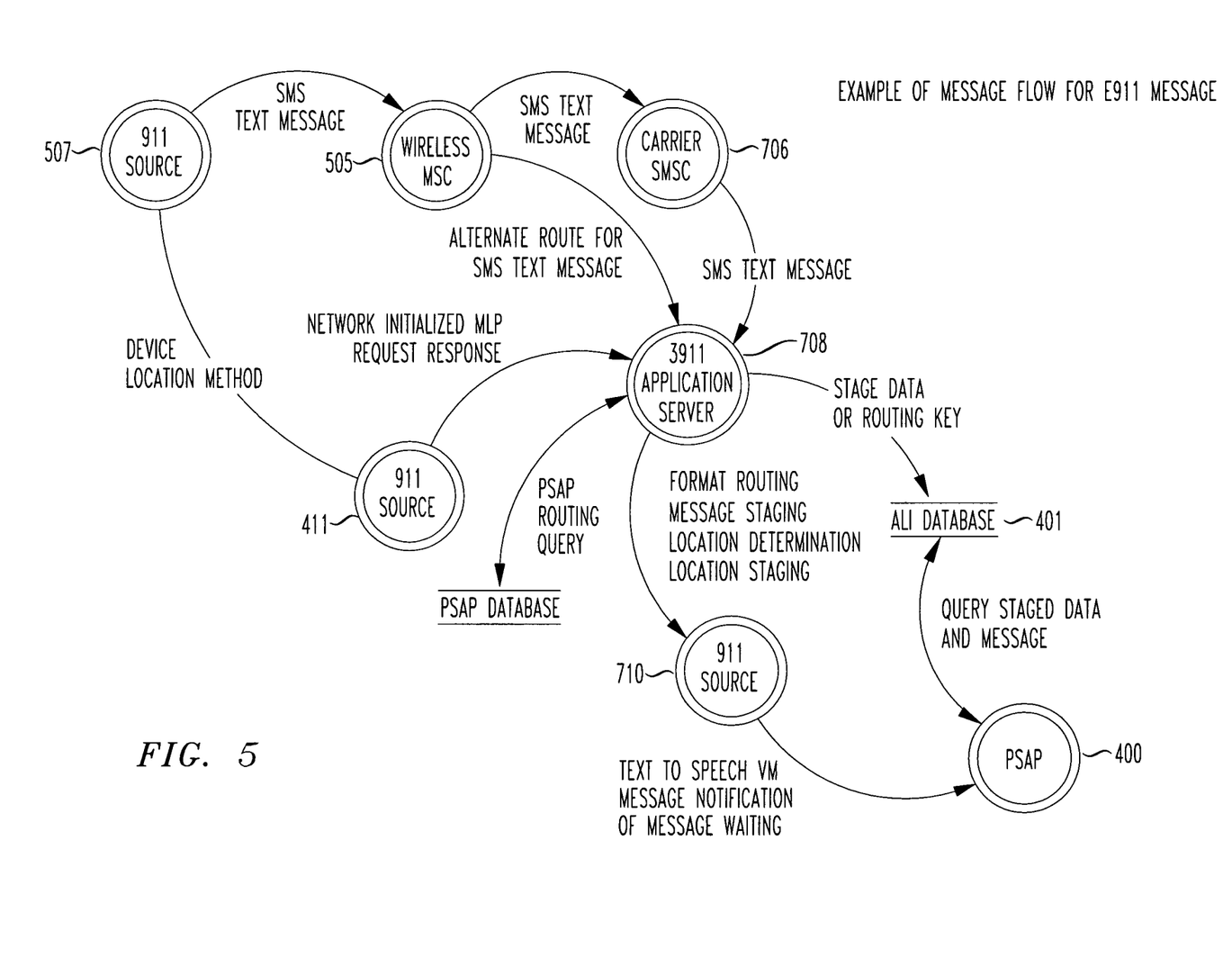
FIG. 5 depicts E911 emergency services data initiated message flow, in accordance with the principles of the present invention.

FIG. 5 depicts E911 emergency services data initiated message flow, in accordance with the principles of the present invention.

In particular, as shown in FIG. 5, a more generic view of SMS text message E911 emergency data request flow is depicted showing the message flow of a packet data emergency services message of any non-voice data type, not just SMS, e.g., email, multi-media services (MMS), etc.

FIG. 5 shows the original SMS text message E911 emergency data request passed from a 911 source 507 to a wireless mobile switching center (MSC) 505. The SMS text message E911 emergency data request is passed from the wireless MSC 505 to the SMSC 706, and then to the 911 application server 708. An alternate route from the MSC 505 to the 911 application server 708 may be taken, bypassing the SMSC 706.

The 911 application server initiates a location request from an appropriate location based services (LBS) platform 411, and receives a response back. The LBS platform 411 locates the 911 source 507 via any appropriate location method.

The 911 application server 708 queries a PSAP database for routing information to an appropriate PSAP servicing the current location of the 911 source 507.

The 911 application server 708 stages location data or a routing key in the ALI database 401, making it available for query by the PSAP 400.

An audible notification of the pending SMS text message E911 emergency data request may be passed by the 911 application server 708 to an emergency services gateway 710, and passed to the PSAP 400.

Figure 6:
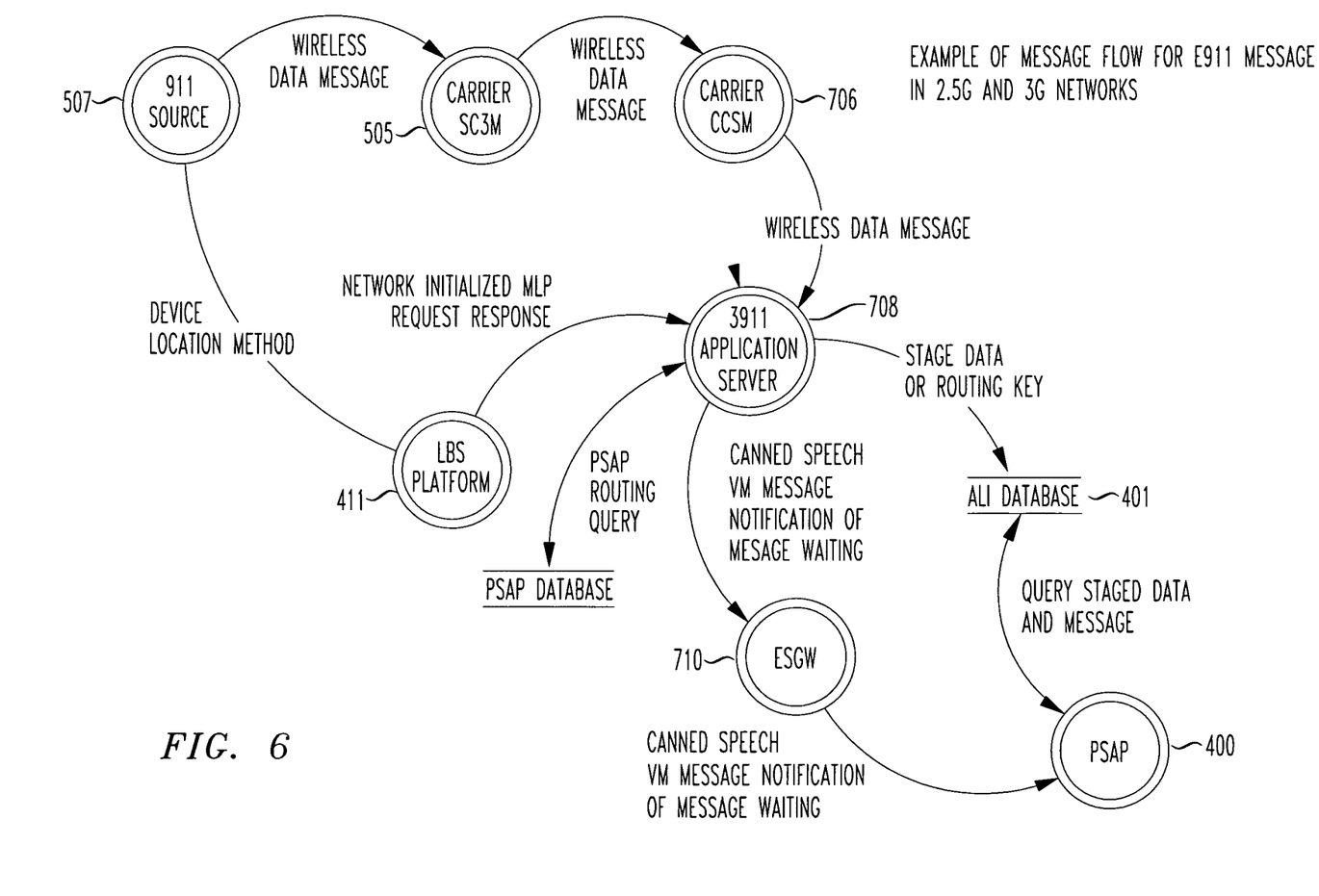
FIG. 6 shows replacement of a wireless MSC shown in FIG. 5 with an Serving GPRS Support Node (SGSN) and Gateway GPRS Support Node (GGSN) pair for delivery to an S911 application server for a data stream emergency services request, as opposed to an SMS text-based emergency services request.

FIG. 6 shows replacement of a wireless MSC shown in FIG. 5 with an SGSN and GGSN pair for delivery to an S911 application server for a data stream emergency services request, as opposed to an SMS text-based emergency services request.

In particular, FIG. 6 shows an example of third generation (3 G) wireless data E911 message flow for an E911 message in 2.5 generation (2.5 G) and third generation (3 G) networks, in accordance with the principles of the present invention.

FIG. 6 shows the applicability of the principles of the present invention, embodied with an SMS text message E911 emergency data request, to a more general wireless data (non-voice) E911 emergency data request (e.g., email, etc.)

The invention enables a PSAP to receive, process, and act upon a wide variety of data based (non-voice) packetized emergency services messages, ranging from simple text-based messages such as a traditional SMS message, to complex images either contained within or attached as payload to a data initiated E911 emergency services, packetized (e.g., Internet Protocol (IP) based) message.

The invention can be used to enable automated systems to provide warnings or notifications to operator monitored services that have a specific geographic regional coverage. The invention has specific applicability to wireless carriers, but is applicable in a larger sense to the broader telecommunication market, including broadband, wireline, voice over Internet Protocol (VoIP), etc.

While the invention has been described with reference to the exemplary embodiments thereof, those skilled in the art will be able to make various modifications to the described embodiments of the invention without departing from the true spirit and scope of the invention.

What is claimed is:

1. A method of providing text message E911 emergency services, comprising:
   receiving a connectionless packet switched network based E911 emergency text message received from an end user emergency messaging device;
   determining an originator of said E911 emergency text message;
   establishing an ongoing two-way text communication channel with said originator of said E911 emergency text message;
   staging a payload of said E911 emergency text message as a record in an automatic location identification (ALI) database; and
   using SMDPP message to provide a location associated with said connectionless packet-switched network based E911 emergency text message to said PSAP.

2. The method of providing text message E911 emergency services according to claim 1, wherein said location comprises:
   a geographic location.

3. The method of providing text message E911 emergency services according to claim 1, wherein said location comprises:
   a civic location.

4. The method of providing text message E911 emergency services according to claim 3, wherein said civic location comprises at least one of:
   a street address; and
   a place name.

5. The method of providing text message E911 emergency services according to claim 4, wherein said location comprises:
   a MSC/Serving Cell ID.

6. The method of providing text message E911 emergency services according to claim 1, wherein said location comprises:
   a geo-location.

7. The method of providing text message E911 emergency services according to claim 6, wherein said staged location comprises at least one of:
- a URI; and
- a URL.

8. The method of providing text message E911 emergency services according to claim 1, further comprising:
- providing said staged E911 emergency text message together with said location of said end user emergency messaging device, to said public safety access point (PSAP).

9. The method of providing text message E911 emergency services according to claim 8, further comprising:
- providing a notification to said public safety access point of receipt of said E911 emergency text message.

10. The method of providing text message E911 emergency services according to claim 9, wherein:
- said notification is an audible notification.

11. The method of providing text message E911 emergency services according to claim 1, further comprising:
- determining an originator of said E911 emergency text message; and
- logging said originator of said E911 emergency text message to establish a two-way communication channel.

12. The method of providing text message E911 emergency services according to claim 1, wherein said E911 emergency text message comprises:
- a short messaging system (SMS) message.

13. The method of providing text message E911 emergency services according to claim 1, wherein said E911 emergency text message comprises:
- an email.

14. The method of providing text message E911 emergency services according to claim 1, wherein said E911 emergency text message comprises:
- an Internet chat message (XMPP).

15. The method of providing text message E911 emergency services according to claim 1, wherein said E911 emergency text message comprises:
- an XML post message (HTTP).

16. The method of providing text message E911 emergency services according to claim 1, wherein said E911 emergency text message comprises:
- a multimedia message service (MMS) image.

17. Apparatus for providing text message E911 emergency services, comprising:
- means for receiving a connectionless packet switched network based E911 emergency text message received from an end user emergency messaging device;
- means for staging a payload of said E911 emergency text message as a record in an automatic location identification (ALI) database;
- means for determining an originator of said E911 emergency text message;
- means for establishing an ongoing two-way text communication channel with said originator of said E911 emergency text message; and
- means for using SMDPP message to provide a location associated with said connectionless packet-switched network based E911 emergency text message to said PSAP.

18. The apparatus for providing text message E911 emergency services according to claim 17, wherein said location comprises:
- a geographic location.

19. The apparatus for providing text message E911 emergency services according to claim 17, wherein said location comprises:
- a civic location.

20. The apparatus for providing text message E911 emergency services according to claim 19, wherein said civic location comprises at least one of:
- a street address; and
- a place name.

21. The apparatus for providing text message E911 emergency services according to claim 20, wherein said location comprises:
- a MSC/Serving Cell ID.

22. The apparatus for providing text message E911 emergency services according to claim 17, wherein said location comprises:
- a geo-location.

23. The apparatus for providing text message E911 emergency services according to claim 22, wherein said staged location comprises at least one of:
- a URI; and
- a URL.

24. The apparatus for providing text message E911 emergency services according to claim 17, further comprising:
- means for providing said staged E911 emergency text message together with said location of said end user emergency messaging device, to said public safety access point (PSAP).

25. The apparatus for providing text message E911 emergency services according to claim 17, further comprising:
- means for providing a notification to said public safety access point of receipt of said E911 emergency text message.

26. The apparatus for providing text message E911 emergency services according to claim 25, wherein:
- said notification is an audible notification.

27. The apparatus for providing text message E911 emergency services according to claim 17, wherein said E911 emergency text message comprises:
- a short messaging system (SMS) message.

28. The apparatus for providing text message E911 emergency services according to claim 17, wherein said E911 emergency text message comprises:
- an email.

\* \* \* \* \*